United States Patent
Sun et al.

(10) Patent No.: US 12,017,346 B2
(45) Date of Patent: Jun. 25, 2024

(54) ARTICULATED ACTUATED FINGER WITH SELF-LOCKING JOINTS

(71) Applicant: CITY UNIVERSITY OF HONG KONG, Kowloon (HK)

(72) Inventors: Dong Sun, Hong Kong (HK); Qiqiang Hu, Hong Kong (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 668 days.

(21) Appl. No.: 17/211,794

(22) Filed: Mar. 24, 2021

(65) Prior Publication Data

US 2022/0305676 A1 Sep. 29, 2022

(51) Int. Cl.
| | | |
|---|---|---|
| *B25J 15/10* | (2006.01) | |
| *B25J 9/10* | (2006.01) | |
| *B25J 15/00* | (2006.01) | |
| *F03G 7/06* | (2006.01) | |
| *F16H 31/00* | (2006.01) | |

(52) U.S. Cl.
CPC ............ *B25J 15/106* (2013.01); *B25J 9/102* (2013.01); *B25J 9/1085* (2013.01); *B25J 15/0009* (2013.01); *F03G 7/06145* (2021.08); *F16H 31/004* (2013.01)

(58) Field of Classification Search
CPC ...... B25J 15/106; B25J 9/102; B25J 15/0009; F16H 31/004
USPC ......................................................... 294/213
See application file for complete search history.

(56) References Cited

U.S. PATENT DOCUMENTS

| | | | | |
|---|---|---|---|---|
| 5,378,033 | A * | 1/1995 | Guo ......................... | A61F 2/586 623/64 |
| 5,888,246 | A * | 3/1999 | Gow ........................ | A61F 2/583 623/64 |
| 7,795,832 | B2 * | 9/2010 | Kawabuchi ........... | B25J 15/0009 901/38 |
| 8,141,925 | B2 * | 3/2012 | Mizuno .................... | B25J 9/102 294/106 |
| 8,757,690 | B2 * | 6/2014 | Gao ...................... | B25J 15/0213 294/198 |
| 9,492,928 | B2 * | 11/2016 | Moore ................. | B25J 15/0009 |
| 10,653,539 | B2 * | 5/2020 | Cazenave ............... | A61F 2/583 |
| 11,597,099 | B2 * | 3/2023 | Zappatore ................ | B25J 15/08 |
| 2012/0112485 | A1 * | 5/2012 | Lee .......................... | B25J 9/103 294/213 |
| 2012/0150323 | A1 * | 6/2012 | Wisse ...................... | A61F 2/588 623/64 |
| 2014/0180477 | A1 * | 6/2014 | Chung ................. | B25J 15/0213 294/198 |

* cited by examiner

*Primary Examiner* — Paul T Chin (57) ABSTRACT

An articulated finger. The articulated finger comprises a first phalange; a second phalange; a self-locking joint coupling the first phalange to the second phalange, wherein the self-locking joint is configured to allow motion in a first rotational direction of the first phalange relative to the second phalange and prevent motion in a second rotational direction of the first phalange relative to the second phalange, wherein the first rotational direction is opposite the second rotational direction; and a compliant actuator configured to actuate the first phalange in the first rotational direction relative to the second phalange.

19 Claims, 6 Drawing Sheets

ARTICULATED ACTUATED FINGER WITH SELF-LOCKING JOINTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Robot structures such as robotic clamps, robotic arms, robotic hands have applications in a variety of industrial and commercial applications. Robot structures can be used to interact with objects in a hazardous environment. Robot structures may be used in unmanned vehicles on earth or on the moon or on mars. Robot structures can be used to handle radio active substances harmful to human beings.

SUMMARY

In an embodiment, an articulated finger is disclosed. The articulated finger comprises a first phalange, a second phalange, and a self-locking joint coupling the first phalange to the second phalange. The self-locking joint is configured to allow motion in a first rotational direction of the first phalange relative to the second phalange and prevent motion in a second rotational direction of the first phalange relative to the second phalange, wherein the first rotational direction is opposite the second rotational direction. The articulated finger further comprises a compliant actuator configured to actuate the first phalange in the first rotational direction relative to the second phalange.

In another embodiment, a method of assembling an articulated finger with self-locking joints is disclosed. The method comprises coupling together a distal phalange, a middle phalange, and a first ratchet gear, wherein the first ratchet gear is fixed relative to the distal phalange and is rotatable relative to the middle phalange and coupling together the middle phalange, a proximal phalange, and a second rachet gear, wherein the second ratchet gear is fixed relative to the proximal phalange and is rotatable relative to the middle phalange. The method further comprises coupling a first pawl to the middle phalange, wherein the first pawl is configured to engage with the first ratchet gear to establish a first self-locking joint between the distal phalange and the middle phalange and coupling a second pawl to the middle phalange, wherein the second pawl is configured to engage with the second ratchet gear to establish a second self-locking joint between the proximate phalange and the middle phalange.

In yet another embodiment, a portable multi-finger gripper is disclosed. The portable multi-finger gripper comprises an electric battery and a gripper body retaining the electric battery. The portable multi-finger gripper further comprises a plurality of articulated fingers with self-locking joints each coupled to the gripper body, wherein at least one articulated finger of the plurality of articulated fingers is oriented to close in opposition to the closing direction of at least one other articulated finger of the plurality of articulated fingers. Each articulated finger comprises a distal phalange, a middle phalange, a first ratchet, wherein the first ratchet, a distal end of the middle phalange, and a proximal end of the distal phalange are coupled together to form a first self-locking joint, a proximal phalange, a second ratchet, wherein the second ratchet, a proximal end of the middle phalange, and a distal end of the proximal phalange are coupled together to form a second self-locking joint, and a grip release actuator coupled to the middle phalange, electrically coupled to the electric battery, wherein the grip release actuator is operable to escape the first ratchet and the second ratchet. The portable multi-finger gripper further comprises a plurality of grip close actuators retained by the gripper body, electrically coupled to the electric battery, wherein each grip close actuator is mechanically coupled to one articulated finger and operable to drive the articulated finger to close.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A bioinspired articulated finger with self-locking joints is taught by the present disclosure. The self-locking joints promote the articulated finger supporting loads and/or maintaining a forceful grip with low power consumption or no power consumption once the grip has been established. In an embodiment, the self-locking joint of this finger comprises a ratchet mechanism (e.g., using a ratchet gear and pawl) and a spring. The ratchet mechanism, when the pawl engages with and stops the reverse motion of the ratchet gear, enables the finger to sustain a grip force for the finger without power input. In an embodiment, an actuator such as a long shape memory alloy coil (SMAc) located away from the finger (e.g., in a housing to which the finger is coupled) can be energized to pull a line (e.g., a line suggested by the function of a tendon in a biological finger) to close the fingers, establishing a grip on an object, and a short SMAc can be energized to actuate the pawl to escape the ratchet gear to relax the established grip to release the object.

The present disclosure also teaches a portable multi-finger gripper. For example, a portable three-finger gripper may comprise two fingers closing in about the same direction while a third finger is oriented to close in about an opposite direction, whereby the coordinated closing of the three fingers secures and grips an object located between the fingers. When the three fingers have closed down on the object under power, power can be removed and the force of the grip may be maintained by action of the stopped ratchet gears that hold the phalanges of the articulated fingers in a fixed gripping position. The portable gripper can be manually handled by a human being to grip and hold objects without experiencing hand fatigue. The portable gripper may be coupled to various devices and vehicles such as an unmanned aerial vehicle. The portable gripper may also be implemented in the form of a prosthetic device.

Figure 1A:
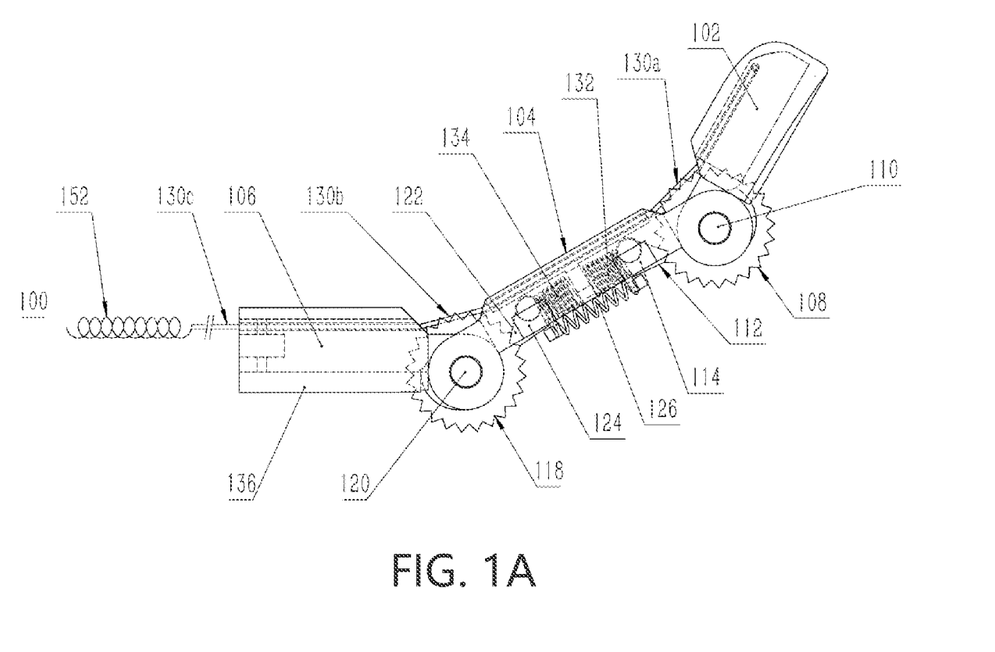
FIG. 1A is an illustration of an assembled articulated finger according to an embodiment of the disclosure.

Turning now to FIG. 1A, an articulated finger 100 is described. In an embodiment, the articulated finger 100 comprises a first phalange 102, a second phalange 104, and a third phalange 106. In another embodiment, the articulated finger 100 may comprise two phalanges. In another embodiment, the articulated finger 100 may comprise four or more phalanges. The phalanges 102, 104, 106 may be formed from plastic material, ceramic material, or a metal material. In an embodiment, the phalanges 102, 104, 106 can be made from photosensitive resin. In an embodiment, the phalanges 102, 104, 106 may be made using three-dimensional (3D) printing fabrication techniques.

A first self-locking joint couples the first phalange 102 to the second phalange 104, and a second self-locking joint couples the second phalange to the third phalange 106. The first self-locking joint is configured to allow motion in a first rotational direction of the first phalange 102 relative to the second phalange 104 and to resist or prevent motion in a second rotational direction of the first phalange 102 relative to the second phalange 104, where the first rotational direction is opposite the second rotational direction, until a release force is applied to the first self-locking joint. In an embodiment, a line 130 can be attached to the first phalange 102 can pass through the second phalange 104 and the third phalange 106 to be attached to a compliant actuator 152 located outside of the articulated finger 100. In an embodiment, the line 130 can comprise any suitable material capable of transferring a tensile force such as plastic, metal, natural fibers, or the like. The composition can depend on the amount of force needed. In some embodiments, the line 130 can comprise a polymer such as a polyethylene material.

In an embodiment, the first self-locking joint comprises a first ratchet mechanism that comprises a first ratchet gear 108 fixedly coupled to the first phalange 102 and a first pawl 112 movably coupled to the second phalange 104. In an embodiment, a first pin 110 can secure the first phalange 102 statically to the first ratchet gear 108 and secure the first phalange 102 rotationally to the second phalange 104. In other embodiments, a different coupling mechanism may be used such as a snap fit, or other coupling. In an embodiment, a first cap 114 can be used to secure the first pawl 112 to the second phalange 104 and restricts the range of motion of the first pawl 112. While described as a cap, the first pawl 112 can also be coupled to the second phalange 104 using any suitable coupling mechanism that prevents the first pawl 112 from be dislocated while still allowing the first pawl 112 to rotate with the first ratchet gear 108 and move out of contact with the first ratchet gear 108. The first pawl can be rotatably coupled to the second phalange 104. The first cap 114 can be secured to the second phalange 104 by adhesive such as glue, by a snap fit, by attaching hardware, or by another securing mechanism.

In an embodiment, the first self-locking joint comprises a first spring 132 that is configured to bias the first pawl 112 into contact with the first ratchet mechanism, for example into contact with the first ratchet gear 108. The first ratchet gear 108 can be toothed, and the first pawl 112 can be configured to ride over the teeth of the first ratchet gear 108 when the ratchet gear 108 rotates in the first rotational direction and to capture the space between teeth of the first ratchet gear 108 and thereby resist or prevent rotation of the first ratchet gear 108 in the second rotational direction. The first spring 132 biases the first pawl 112 to engage with and capture the first ratchet gear 108.

In an embodiment, the first self-locking joint comprises a first actuator 126 coupled to the first pawl 112. In some contexts, the first actuator 126 may be referred to as an open grip actuator. When activated or commanded, the first actuator 126 biases the first pawl 112 out of contact with the first ratchet mechanism, for example out of contact with the first ratchet gear 108, thereby escaping the first ratchet gear 108. When thus escaped by the first pawl 112, the first ratchet gear 108 and the first phalange 102 are enabled to move in the second rotational direction relative to the second phalange 104. It is noted that to bias the first pawl 112 out of contact with the first ratchet mechanism, the first actuator 126 must exert enough force on the first pawl 112 to overcome the oppositely directed biasing force of the first spring 132 and any resisting forces associated with the pawl captured between adjacent teeth or features on the first ratchet gear 108. In an embodiment, the first actuator 126 can comprise a SMAc that is activated when supplied with an appropriate electric and/or thermal input, for example an appropriate voltage and/or current input, for example a 3.2 VDC to 4.2 VDC input (e.g., a nominal 3.7 VDC±0.5 VDC).

In an embodiment, the first actuator 126 can be a short SMAc, for example between about 2 mm and about 8 mm long, or about 5 mm long.

A second self-locking joint is configured to allow motion in a third rotational direction of the second phalange 104 relative to the third phalange 106 and to prevent motion in a fourth rotational direction of the second phalange 104 relative to the third phalange 106, where the third rotational direction is opposite the fourth rotational direction. In an embodiment, the second self-locking joint comprises a second ratchet mechanism that comprises a second ratchet gear 118 coupled to the third phalange 106 and a second pawl 122 coupled to the second phalange 104. In an embodiment, a suitable coupling device such as a second pin 120 can secure the third phalange 106 statically to the second ratchet gear 118 and secures the third phalange 106 rotationally to the second phalange 104, but in other embodiments a different coupling mechanism may be used such as a snap fit, or other coupling. In an embodiment, a second cap 124 secures the second pawl 122 to the second phalange 104 and can restrict the range of motion of the second pawl 122. The second cap 124 can be secured to the second phalange 104 by adhesive such as glue, by a snap fit, by attaching hardware, or by another securing mechanism.

In an embodiment, the second self-locking joint comprises a second spring 134 that is configured to bias the second pawl 122 into contact with the second ratchet mechanism, for example into contact with the second ratchet gear 118. The second ratchet gear 118 can comprise one or more features such as gear teeth, and the second pawl 122 can be configured ride over the teeth of the second ratchet gear 118 when the second ratchet gear rotates in the third rotational direction and to capture the space between the teeth of the second ratchet gear 118 and resist or prevent rotation of the second ratchet gear 118 in the fourth rotational direction. The second spring 134 biases the second pawl 122 to engage with and capture the second ratchet gear 118.

The first cap 114 and the second cap 124 may be made of ceramic material, metal material, or plastic material. In an embodiment, the first cap 114 and the second cap 124 comprise photosensitive resin and may be made using a 3D printing fabrication technique. The first ratchet gear 108, the first pawl 112, the second ratchet gear 118 and the second pawl 122 may be made of ceramic material, metal material, or plastic material. In an embodiment, the first ratchet gear 108, the first pawl 112, the second ratchet gear 118 and the second pawl 122 can be made of nylon material, for example HP3DHR-PA12 nylon material.

In an embodiment, the first actuator 126 can also be coupled to the second pawl 122. When activated or commanded, the first actuator 126 can bias the second pawl 112 out of contact with the second ratchet mechanism, for example out of contact with the second ratchet gear 118, thereby escaping the second ratchet gear 118. When thus escaped by the second pawl 122, the second phalange 104 is enabled to move in the fourth rotational direction relative to the third phalange 106. It is noted that to bias the second pawl 122 out of contact with the second ratchet mechanism, the first actuator 126 must exert enough force on the second pawl 122 to overcome the oppositely directed biasing force of the second spring 134 and any retaining force of the second pawl 112 captured within the teeth of the second ratchet gear 118.

In some embodiments, the strength of the first spring 132 may not be equal to the strength of the second spring 134. For example on the articulated finger 100, if the strength of the first spring 132 is greater than the strength of the second spring 134, when the second actuator 152 is activated to pull the line 130, the second actuator 152 can overcome the strength of the second spring 134, the second self-locking joint will rotate, and the second phalange 104 will move in the third rotational direction relative to the third phalange 106 while the first self-locking joint remains still. As the second actuator 152 continues to activate or the second phalange 104 is stopped moving, the second actuator 152 will overcome the strength of the first spring 132, the first self-locking joint will rotate, and the first phalange 102 will move in the first rotational direction relative to the second phalange 104. If instead the strength of the second spring 134 is greater than the strength of the first spring 132, this sequence of rotation of the first self-locking joint and the second self-locking joint will be reversed. In an embodiment, the strength of the first spring 132 and the second spring 134 may be about equal, and in this case the first self-locking joint may rotate before the second self-locking joint due to the influence of gravity.

In an embodiment, the first spring 132 can have a stiffness of between about 1.5 N/cm to about 4 N/cm, or about 2.7 N/cm, and the second spring 134 can have a stiffness of between about 1.5 N/cm and about 0.5 N/cm, or about 1.0 N/cm, such that the activation of the second actuator 152 moves the second phalange 104 in the third rotational direction relative to the third phalange 106 before it moves the first phalange 102 in the first rotational direction relative to the second phalange 104. In some embodiments, a ratio of the stiffness of the second spring 134 to the stiffness of the first spring can be in a range of about 5:1 to about 1.5:1, or between about 3:1 to about 2:1. In another embodiment, the first spring 132 has a stiffness of about 1.0 N/cm, and the second spring 134 has a stiffness of about 2.7 N/cm, such that the activation of the second actuator 152 moves the first phalange 102 in the first rotational direction relative to the second phalange 104 before it moves the second phalange 104 in the third rotational direction relative to the third phalange 106. In another embodiment, the springs 132, 134 can have different stiffness values than those identified here.

In an embodiment, the line 130 can be coupled to a second actuator 152 that may be external to the articulated finger 100. In some contexts, the second actuator 152 may be referred to as a close grip actuator. In some embodiments, the second actuator 152 can be a SMAc that is activated when supplied with an appropriate electrical and/or heat input, for example an appropriate voltage and/or current input, for example a 3.2 VDC to 4.2 VDC input (e.g., a nominal 3.7 VDC±0.5 VDC). In an embodiment the second actuator 152 can be a long SMAc, for example between about 20 mm and 80 mm long, or about 50 mm long. The second actuator 152 can be a compliant actuator that comprises a stretchable material. The second actuator 152 may be retained by a portable gripper to which the articulated finger 100 is coupled. While described as a SMAc and/or compliant actuator, any suitable actuator can be used for the second actuator. Since the second actuator is external to the articulated finger 100, various size actuators can be used.

The portable gripper or other fixture may comprise a source of electrical power to activate the first actuator 126 and the second actuator 152 under selective control. When the second actuator 152 is activated it pulls on the line 132. The force applied by the second actuator 152 at point 130c transfers itself through the third phalange 106 to point 130b of the line and through the second phalange 104 to point 130a where the line 130 attaches to the first phalange 102. The line 130 can attach to a side of the first phalange 102 to create an unbalanced for when tension is applied. This tension applied to the line 130 causes the first phalange 102 to move in the first rotational direction relative to the second phalange 104, and causes the second phalange 104 to move in the third rotational direction relative to the third phalange 106. This motion may be referred to as a closing motion or a gripping motion in some contexts, and the opposite motion of the phalanges 102, 104 may be referred to as an opening motion or a grip releasing motion in some contexts. The second actuator 152 when supplied with electric power can shrink in length. For example, the second actuator 152 is heated by electric current passing through it when supplied with electric power, and this heat causes the second actuator 152 to assume its shape memory conformation which is shorter.

In an embodiment, a covering or skin 136 may be placed over the phalanges 102, 104, 106. The skin 136 may be positioned over the first phalange 102, absent over the first ratchet gear 108, positioned over the second phalange 104, absent over the second ratchet gear 108, and positioned over the third phalange 106. The skin 136 may comprise soft silicone material, for example polydimethylsiloxane (PDMS). In an embodiment, the size of the articulated finger 100 is approximately the size of a human finger. The skin 136 may promote friction gripping of objects by the finger 100.

Figure 1B:
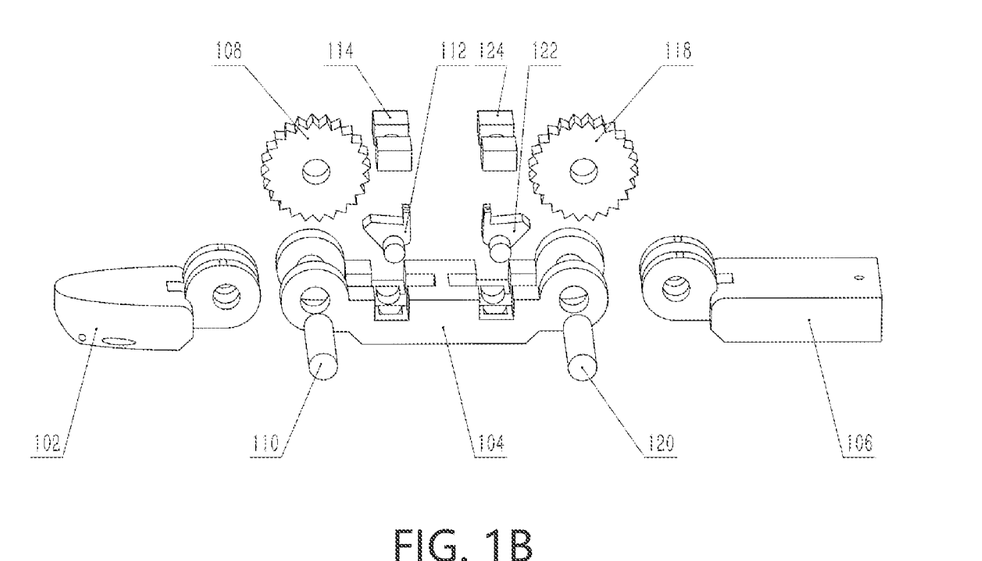
FIG. 1B is an illustration of an initial phase of assembly of an articulated finger according to an embodiment of the disclosure.
Figure 1C:
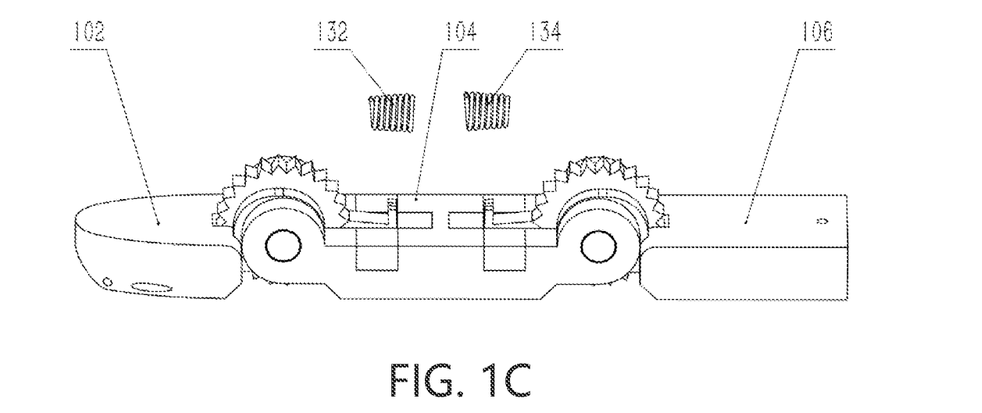
FIG. 1C is an illustration of an intermediate phase of assembly of an articulated finger according to an embodiment of the disclosure.
Figure 1D:
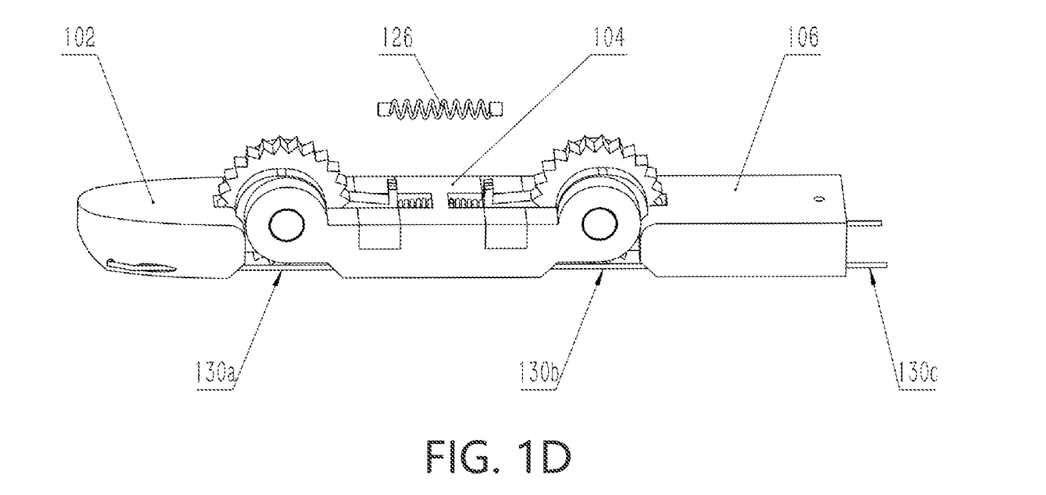
FIG. 1D is an illustration of a final phase of assembly of an articulated finger according to an embodiment of the disclosure.
Figure 2A:
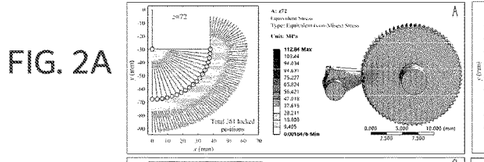
FIG. 2A is an illustration of an implementation of a rachet mechanism according to an embodiment of the disclosure.
Figure 2B:
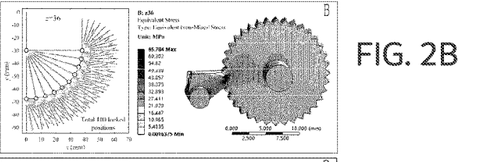
FIG. 2B is an illustration of another implementation of a rachet mechanism according to an embodiment of the disclosure.
Figure 2C:
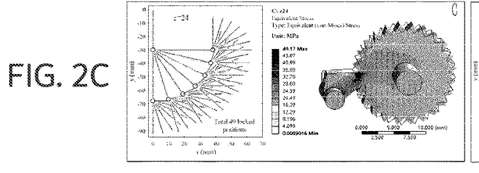
FIG. 2C is an illustration of yet another implementation of a rachet mechanism according to an embodiment of the disclosure.
Figure 2D:
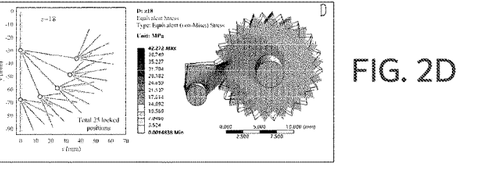
FIG. 2D is an illustration of yet an another implementation of a rachet mechanism according to an embodiment of the disclosure.

Turning to FIG. 1B, FIG. 1C, and FIG. 1D, an assembly process for building the articulated finger 100 is described. It is understood that the articulated finger taught herein can be built in a variety of different ways and according to different embodiments while still benefiting from the insights provided herein. For example, while an articulated finger 100 comprising three phalanges 102, 104, 106 is described and illustrated, an articulated finger comprising only two phalanges or an articulated finger comprising four or more phalanges may be constructed in the same manner and provide useful benefits.

In FIG. 1B, the first phalange 102 can be coupled statically to the first ratchet gear 108 and coupled rotationally to the second phalange 104 by the first pin 110. The first pawl 112 can be secured in the second phalange 104 by the first cap 114 that may be secured to the second phalange 104 by an adhesive or by a snap fit or by attachment hardware. The first pawl 112 can be free to partially rotate, for example within an arc of 0 degrees, 15 degrees, 30 degrees, 45 degrees, 60 degrees, 75 degrees, 90 degrees, or some other fraction of 180 degrees. The third phalange 106 can be coupled statically to the second ratchet gear 118 and rotationally coupled to the second phalange 104 by the second pin 120. The second pawl 122 can be secured in the second phalange 104 by the second cap 124. The second cap 124 may be secured to the second phalange 104 by an adhesive or by a snap fit or by attachment hardware. The second pawl 122 can be free to rotate partially, for example within an arc of 0 degrees, 15 degrees, 30 degrees, 45 degrees, 60 degrees, 75 degrees, 90 degrees, or some other fraction of 180 degrees.

In FIG. 1C, the first spring 132 can be placed into the second phalange 104 to bias the first pawl 112 into contact with the first ratchet gear 108, and the second spring 134 can be placed into the second phalange 104 to bias the second pawl 122 into contact with the second ratchet gear 118. In FIG. 1D, the line 130 can be installed and attached to the first phalange 102, and the first actuator 126 can be coupled to the first pawl 112 and to the second pawl 122. An electric line may be attached to the first actuator 126 that can be attached to a portable gripper or other fixture separate from the articulated finger. The end of the line 130 may likewise be attached to the second actuator 152 retained by the portable gripper or other fixture. It is noted that by placing the second actuator 152 off of the finger 100 the finger 100 may be made lighter and with a compact structure that provides advantages in some use cases.

The articulated finger 100 may be assembled using a method of assembling an articulated finger with self-locking joints. This method may comprise coupling together a distal phalange (e.g., the first phalange 102), a middle phalange (e.g., the second phalange 104), and a first ratchet gear (e.g., the first ratchet gear 108), wherein the first ratchet gear can be fixed relative to the distal phalange and is rotatable relative to the middle phalange and coupling together the middle phalange, a proximal phalange (e.g., the third phalange 106), and a second rachet gear (e.g., the second ratchet gear 118), wherein the second ratchet gear can be fixed relative to the proximal phalange and is rotatable relative to the middle phalange. This method may further comprise coupling a first pawl (e.g., first pawl 112) to the middle phalange, wherein the first pawl is configured to engage with the first ratchet gear to establish a first self-locking joint between the distal phalange and the middle phalange; and coupling a second pawl (e.g., second pawl 122) to the middle phalange, wherein the second pawl can be configured to engage with the second ratchet gear to establish a second self-locking joint between the proximate phalange and the middle phalange.

Turning now to FIG. 2, a relationship between numbers of teeth on the ratchet gears 108, 118 to a number of locked positions of the articulated finger 100 is described. In example A, the ratchet gears 108, 118 are illustrated as having 72 teeth and having about 361 different locked positions that are possible. In example B, the ratchet gears 108, 118 are illustrated as each having 36 teeth and having about 100 different locked positions that are possible. In example C, the ratchet gears 108, 118 are illustrated as each having 24 teeth and having about 49 different locked positions that are possible. In example D, the ratchet gears 108, 118 are illustrated as having 18 teeth and 25 different locked positions that are possible. While the examples A-D identified above are based on the first ratchet gear 108 having the same number of teeth as the second ratchet gear 118, in an embodiment the first ratchet gear 108 may have either more or fewer teeth than the second ratchet gear 118. It is noted that greater mechanical stress is applied to teeth of a ratchet gear 108, 118 (e.g., stress on the contact area between a tooth of the ratchet gear 108, 118 and a pawl 112, 122) when a larger number of teeth are present than when a smaller number of teeth are present on the ratchet gear 108, 118. This indicates that when larger retaining forces are needed, an appropriate number of teeth can be selected so as to not overcome the mechanical limits of the ratchet gear/pawl combination.

Figure 3A:
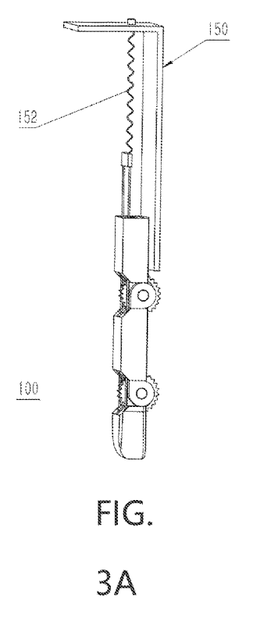
FIG. 3A is an illustration of an articulated finger coupled to a control fixture in an initial relaxed position according to an embodiment of the disclosure.
Figure 3B:
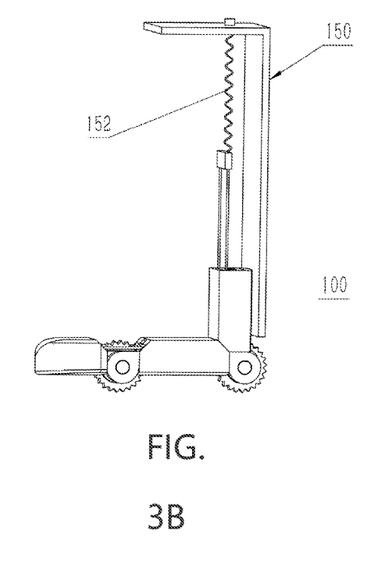
FIG. 3B is an illustration of the articulated finger coupled to the control fixture in a partially closed position according to an embodiment of the disclosure.

Turning now to FIG. 3A, FIG. 3B, FIG. 3C, FIG. 3D, and FIG. 3E, an articulated finger is shown coupled to a fixture that holds the second actuator 152, where the finger 100 passes through a gripping and grip releasing sequence. In FIG. 3A, the articulated finger 100 is extended. In FIG. 3B, the second actuator 152 activates, pulls on line 130, and causes the second phalange 104 to rotate in the third rotational direction relative to the third phalange 106 of the articulated finger 100. As the second phalange 104 rotates in the third rotational direction relative to the third phalange 106, the second pawl 122 is biased by the second spring 134 to engage different ones of the teeth of the second ratchet gear 118 to prevent the second phalange 104 moving in the fourth rotational direction relative to the third phalange 106.

Figure 3C:
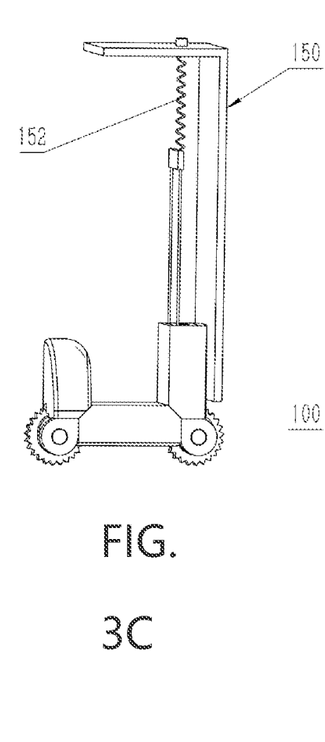
FIG. 3C is an illustration of the articulated finger coupled to the control fixture in a fully closed position according to an embodiment of the disclosure.

In FIG. 3C, the second phalange 104 has reached the limit of its movement in the third rotational direction relative to the third phalange 106, and the first phalange 102 has reached the limit of its movement in the first rotational direction relative to the second phalange 104. As the first phalange 102 rotates in the first rotational direction relative to the second phalange 104, the first pawl 112 is biased by the first spring 132 to engage different ones of the teeth of the first ratchet gear 118 to prevent the first phalange 102 moving in the second rotational direction relative to the second phalange 104.

Figure 3D:
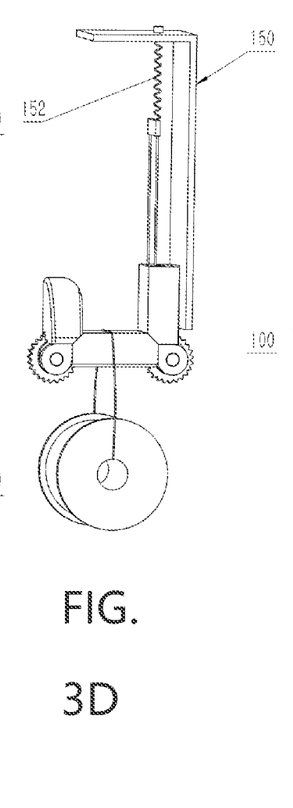
FIG. 3D is an illustration of the articulated finger coupled to the control fixture in the fully closed position supporting a load according to an embodiment of the disclosure.
Figure 3E:
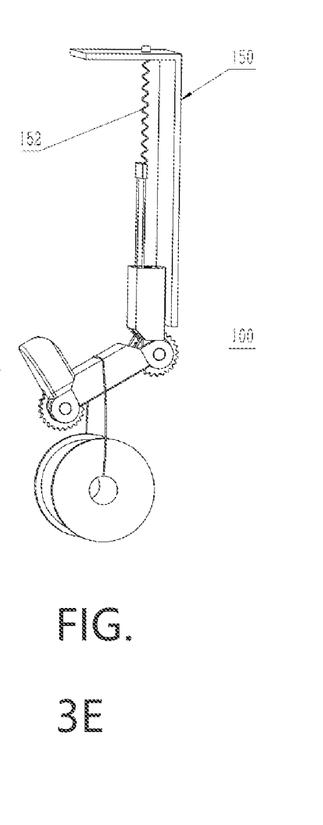
FIG. 3E is an illustration of the articulated finger coupled to the control fixture in a mode of relaxing while loaded according to an embodiment of the disclosure.

In FIG. 3D the articulated finger 100 is shown supporting a load (e.g., a weight) on the second phalange 104. The second actuator 152 may be depowered and not activated, and the articulated finger 100 will maintain its position, due to the second pawl 122 being biased into contact with the teeth of the second ratchet gear 118 and preventing movement of the second phalange 104 in the fourth rotational direction relative to the third phalange 106. The articulated finger 100 may support the load for an extended period of time without consuming energy to maintain its position, because of the self-locking joints of the articulated finger 100. In FIG. 3E, the articulated finger 100 is illustrated in the process of releasing its grip and relaxing, for example by activating the first actuator 126 to release the engagement of the second pawl 122 with the teeth of the second ratchet gear 118.

Figure 4A:
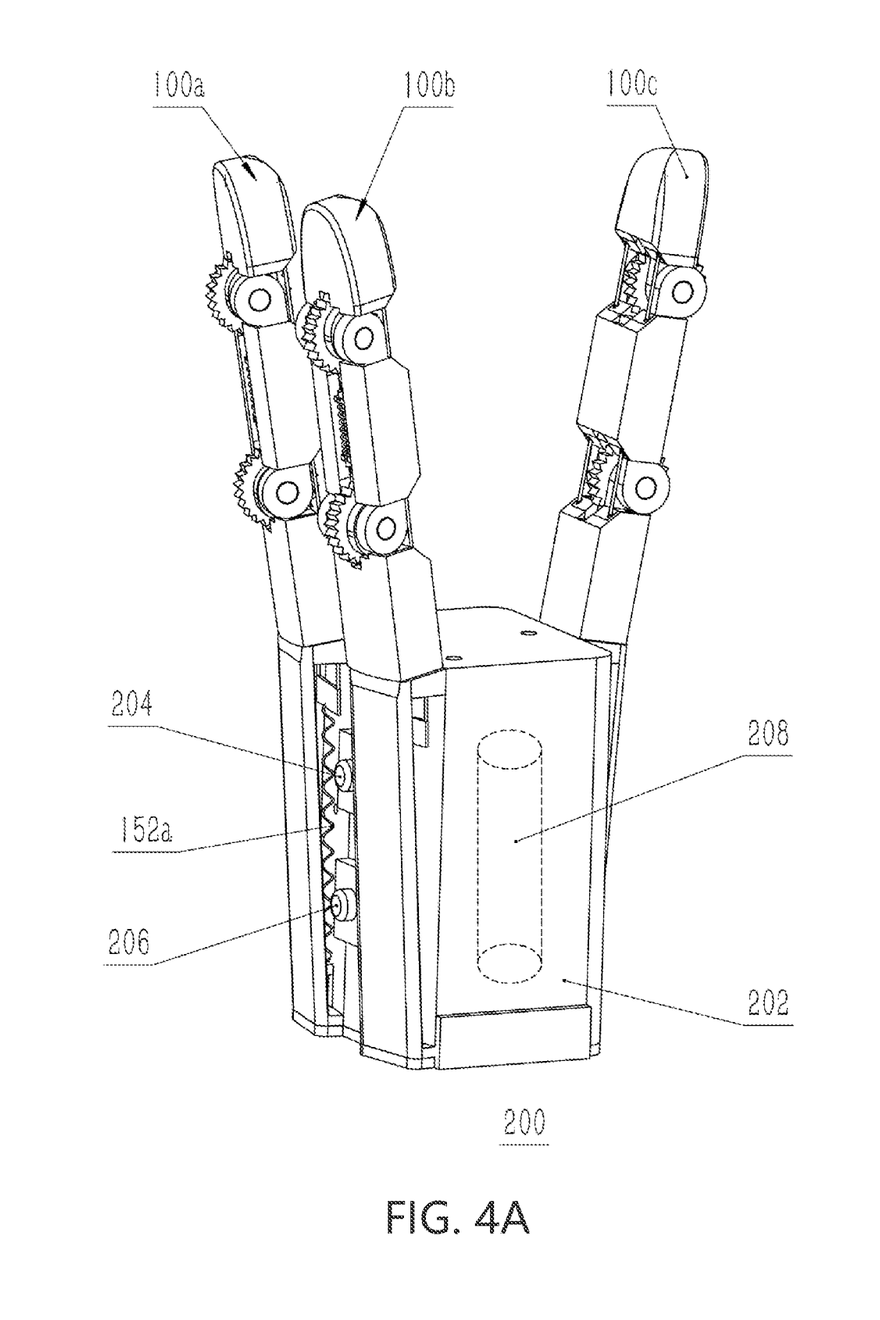
FIG. 4A is an illustration of a portable multi-finger gripper according to an embodiment of the disclosure.
Figure 4B:
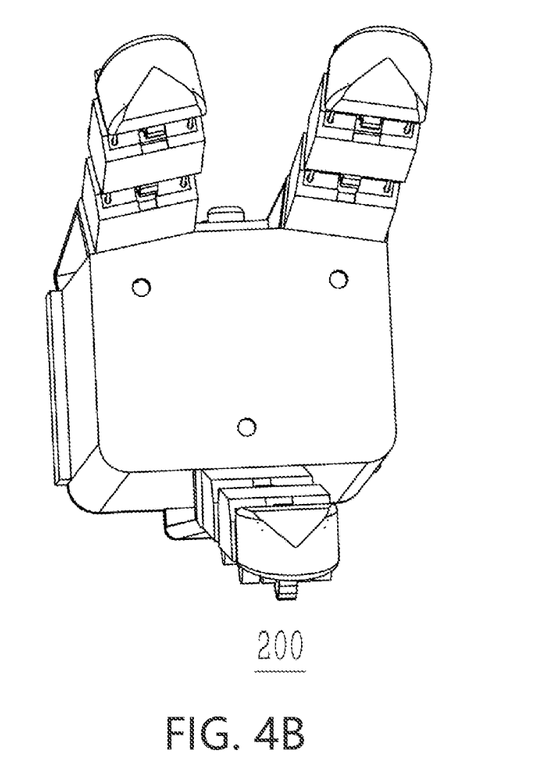
FIG. 4B is another illustration of the portable multi-finger gripper according to an embodiment of the disclosure.

Turning now to FIGS. 4A and 4B, a portable gripper 200 is described. The portable gripper 200 cam comprise a first articulated finger 100a, a second articulated finger 100b, a third articulated finger 100c, a gripper body 202, a grip close control button 204, a grip release control button 206, and an electric power source 208. The gripper body 202 retains the control buttons 204, 206 and the electric power source 208.

The gripper body 202 may be a housing or equipment enclosure that is configured to be gripped by a human hand. Alternatively, the gripper body 202 may have a different form such as amenable for attaching to another structure such as an unmanned aerial vehicle. In some embodiments the portable gripper 200 may not have control buttons 204, 206 but instead has control electronics that may be commanded from a system to which the portable gripper 200 is coupled, such as an unmanned aerial vehicle. In an embodiment, the first articulated finger 100a and the second articulated finger 100b close in approximately the same direction and the third articulated finger 100c closes in a direction opposite to that of the first and second articulated fingers 100a, 110b, whereby to enclose and grip an object when the articulated fingers 100a, 100b, 100c are commanded to grip. FIG. 4B is a view looking into the articulated fingers 100a, 100b, 100c.

In an embodiment, the electric power source 208 can be an electric battery. The electric battery may supply a nominal 3.7 VDC±0.5 VDC power. The housing 202 comprises a second actuator 152a associated with the first articulated finger 100a, a second actuator 152b associated with the second articulated finger 100b, and a second actuator 152c associated with the third articulated finger 100c. The second actuator 152a may be referred to as a first close grip actuator, the second actuator 152b may be referred to as a second close grip actuator, and the second actuator 152c may be referred to as a third close grip actuator. When the grip command button 204 is pressed, electric power can be delivered from the electric power source 208 to the close grip actuators 152a, 152b, 152c, causing the articulated fingers 100a, 100b, 100c to close at the same time, for example to grip an object located within the fingers 100a, 100b, 100c. When the grip release command button 206 is pressed, electric power can be delivered form the electric power source 208 to the first actuator 126 (also referred to as an open grip actuator) in each articulated finger 100a, 100b, 100c, causing the articulated fingers 100a, 100b, 100c to release their grip, for example releasing the object they had previously gripped.

In an embodiment, the portable multi-finger gripper 200 can comprise an electric battery, a gripper body retaining the electric battery, a grip close control button retained by the gripper body, a grip release control button retained by the gripper body, and a plurality of articulated fingers with self-locking joints each coupled to the gripper body, wherein at least one articulated finger of the plurality of articulated fingers is oriented to close in opposition to the closing direction of at least one other articulated finger of the plurality of articulated fingers. Each articulated finger comprises a distal phalange (e.g., the first phalange 102), a middle phalange (e.g., the second phalange 104), a first ratchet (e.g., the first ratchet gear 108 and the first pawl 112), wherein the first ratchet, a distal end of the middle phalange, and a proximal end of the distal phalange are coupled together to form a first self-locking joint, a proximal phalange (e.g., the third phalange 106), a second ratchet (e.g., the second ratchet gear 118 and the second pawl 122), wherein the second ratchet, a proximal end of the middle phalange, and a distal end of the proximal phalange are coupled together to form a second self-locking joint, and a grip release actuator (e.g., first actuator 126) coupled to the middle phalange, electrically coupled to the electric battery, and controlled by the grip release control button, wherein the grip release actuator is operable to escape the first ratchet and the second ratchet. In an embodiment, the portable multi-finger gripper 200 further comprises a plurality of grip close actuators (e.g., second actuator 152) retained by the gripper body, electrically coupled to the electric battery, and controlled by the grip close control button, wherein each grip close actuator is mechanically coupled to one articulated finger and operable to drive the articulated finger to close.

The articulated finger 100 described above describes a soft bioinspired finger that can adapt to various objects and achieve a large holding force with low power consumption. The second actuator 152 can be used as the compliant actuator for the finger 100 and placed outside the finger 100 (e.g., on the fixture 150 or in the housing 202), thereby allowing the finger 100 to be compact and underactuated. The ratchet mechanism (ratchet gears 108, 118 and pawls 112, 122) can be designed as the self-locking joints of the finger 100 to improve its holding force by using the mechanical interlocking without consuming power. In contrast, using conventional methods to improve the holding force of soft fingers has many problems, such as high power consumption and irreversible damage to the compliant actuator, thus limiting their applications. For practical applications where power consumption is paramount, the articulated finger taught herein meets low actuated voltage, compact size, low weight and high payload-to-weight ratio with low power consumption. The articulated finger 100 and the portable gripper 200 taught herein have potential applications in unmanned aerial vehicles and prosthesis where power consumption considerations may be paramount. The proposed devices and methods provides design and construction methods for the bioinspired composite finger. This disclosure introduces a new approach to improve the grip force of the finger with low power consumption.

Having described various devices and methods, certain aspects can include, but are not limited to:

In a first aspect, an articulated finger comprises: a first phalange; a second phalange; a self-locking joint coupling the first phalange to the second phalange, wherein the self-locking joint is configured to allow motion in a first rotational direction of the first phalange relative to the second phalange and prevent motion in a second rotational direction of the first phalange relative to the second phalange, wherein the first rotational direction is opposite the second rotational direction; and a compliant actuator configured to actuate the first phalange in the first rotational direction relative to the second phalange.

A second aspect can include the finger of the first aspect, wherein the self-locking joint comprises: a ratchet mechanism, wherein the ratchet mechanism comprises a ratchet gear coupled to the first phalange; and a pawl rotatably coupled to the second phalange, wherein the pawl is biased into contact with the ratchet mechanism.

A third aspect can include the finger of the second aspect, wherein the self-locking joint further comprises an actuator coupled to the pawl, wherein the actuator is configured to bias the pawl out of contact with the ratchet mechanism.

A fourth aspect can include the finger of the third aspect, wherein the actuator comprises a shape memory alloy coil.

A fifth aspect can include the finger of the third or fourth aspect, wherein the self-locking joint further comprises a spring, wherein the spring contacts the pawl and is configured to bias the pawl into contact with the ratchet mechanism.

A sixth aspect can include the finger of any one of the first to fifth aspects, wherein the compliant actuator comprises a stretchable material.

A seventh aspect can include the finger of any one of the first to sixth aspects, wherein the compliant actuator comprises a shape memory alloy coil coupled to a line, wherein the shape memory alloy coil is configured to shrink and actuate the first phalange in the first rotational direction relative to the second phalange.

In an eighth aspect, a method of assembling an articulated finger with self-locking joints comprises: coupling together a distal phalange, a middle phalange, and a first ratchet gear, wherein the first ratchet gear is fixed relative to the distal phalange and is rotatable relative to the middle phalange; coupling together the middle phalange, a proximal phalange, and a second rachet gear, wherein the second ratchet gear is fixed relative to the proximal phalange and is rotatable relative to the middle phalange; coupling a first pawl to the middle phalange, wherein the first pawl is configured to engage with the first ratchet gear to establish a first self-locking joint between the distal phalange and the middle phalange; and coupling a second pawl to the middle phalange, wherein the second pawl is configured to engage with the second ratchet gear to establish a second self-locking joint between the proximate phalange and the middle phalange.

A ninth aspect can include the method of the eighth aspect, further comprising coupling a first end of an actuator to the first pawl, wherein the actuator is configured to rotate the first pawl out of engagement with the first ratchet gear when activated by electric power.

A tenth aspect can include the method of the ninth aspect, further comprising coupling a second end of the actuator to the second pawl, wherein the actuator is configured to rotate the second pawl out of engagement with the second ratchet gear when activated by electric power.

An eleventh aspect can include the method of any one of the eighth to tenth aspects, further comprising installing a first spring into the middle phalange that biases the first pawl into engagement with the first ratchet gear and installing a second spring into the middle phalange that biases the second pawl into engagement with the second ratchet gear.

A twelfth aspect can include the method of any one of the eighth to eleventh aspects, further comprising coupling threading a line through the proximal phalange and through the middle phalange and coupling a first end of the line to the distal phalange.

A thirteenth aspect can include the method of the twelfth aspect, further comprising coupling a second end of the line to a second actuator that is located off of the articulated finger, wherein when the second actuator is activated by electric power it contracts, pulls on the line, and causes the articulated finger to close.

A fourteenth aspect can include the method of the thirteenth aspect, coupling the second actuator to a gripper body and coupling the proximal phalange to the gripper body.

In a fifteenth aspect, a portable multi-finger gripper comprises: an electrical source; a gripper body retaining the electric source; a plurality of articulated fingers with self-locking joints each coupled to the gripper body, wherein at least one articulated finger of the plurality of articulated fingers is oriented to close in opposition to the closing direction of at least one other articulated finger of the plurality of articulated fingers, wherein each articulated finger comprises: a distal phalange; a middle phalange; a first ratchet, wherein the first ratchet, a distal end of the middle phalange, and a proximal end of the distal phalange are coupled together to form a first self-locking joint; a proximal phalange; a second ratchet, wherein the second ratchet, a proximal end of the middle phalange, and a distal end of the proximal phalange are coupled together to form a second self-locking joint; and a grip release actuator coupled to the middle phalange, electrically coupled to the electric source, wherein the grip release actuator is operable to escape the first ratchet and the second ratchet; and a plurality of grip close actuators retained by the gripper body, electrically coupled to the source battery, wherein each grip close actuator is mechanically coupled to one articulated finger and operable to drive the articulated finger to close.

A sixteenth aspect can include the portable multi-finger gripper of the fifteenth aspect, further comprising a grip close control button retained by the gripper body, wherein the grip release actuator is controlled by the grip close control button; and a grip release control button retained by the gripper body, wherein the grip release actuator is controlled by the grip release control button.

A seventeenth aspect can include the portable multi-finger gripper of the fifteenth or sixteenth aspect, wherein the distal phalange, the middle phalange, and the proximal phalange comprise photosensitive resin.

An eighteenth aspect can include the portable multi-finger gripper of any one of the fifteenth to seventeenth aspects, wherein each articulated finger further comprises a first pawl, a first spring operable to bias the first pawl into engagement with a first ratchet gear of the first ratchet, a second pawl, and a second spring operable to bias the second pawl into engagement with a second ratchet gear of the second ratchet.

A nineteenth aspect can include the portable multi-finger gripper of the eighteenth aspect, wherein a stiffness of the first spring is different from the stiffness of the second spring.

A twentieth aspect can include the portable multi-finger gripper of any one of the fifteenth to nineteenth aspects, wherein each articulated finger further comprises a soft silicone skin over the proximal phalange, the middle phalange, and the distal phalange.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An articulated finger comprising:
a first phalange;
a second phalange;
a self-locking joint coupling the first phalange to the second phalange, wherein the self-locking joint is configured to allow motion in a first rotational direction of the first phalange relative to the second phalange and prevent motion in a second rotational direction of the first phalange relative to the second phalange, wherein the first rotational direction is opposite the second rotational direction; and
a compliant actuator configured to actuate the first phalange in the first rotational direction relative to the second phalange; wherein
the ratchet mechanism comprises a ratchet gear coupled to the first phalange; and
a pawl rotatably coupled to the second phalange, wherein the pawl is biased into contact with the ratchet mechanism.

2. The finger of claim 1, wherein the self-locking joint further comprises an actuator coupled to the pawl, wherein the actuator is configured to bias the pawl out of contact with the ratchet mechanism.

3. The finger of claim 2, wherein the actuator comprises a shape memory alloy coil.

4. The finger of claim 2, wherein the self-locking joint further comprises a spring, wherein the spring contacts the pawl and is configured to bias the pawl into contact with the ratchet mechanism.

5. The finger of claim 1, wherein the compliant actuator comprises a stretchable material.

6. The finger of claim 1, wherein the compliant actuator comprises a shape memory alloy coil coupled to a line, wherein the shape memory alloy coil is configured to shrink and actuate the first phalange in the first rotational direction relative to the second phalange.

7. A method of assembling an articulated finger with self-locking joints, comprising:
coupling together a distal phalange, a middle phalange, and a first ratchet gear, wherein the first ratchet gear is fixed relative to the distal phalange and is rotatable relative to the middle phalange;
coupling together the middle phalange, a proximal phalange, and a second rachet gear, wherein the second ratchet gear is fixed relative to the proximal phalange and is rotatable relative to the middle phalange;
coupling a first pawl to the middle phalange, wherein the first pawl is configured to engage with the first ratchet gear to establish a first self-locking joint between the distal phalange and the middle phalange; and
coupling a second pawl to the middle phalange, wherein the second pawl is configured to engage with the second ratchet gear to establish a second self-locking joint between the proximate phalange and the middle phalange.

8. The method of claim 7, further comprising coupling a first end of an actuator to the first pawl, wherein the actuator is configured to rotate the first pawl out of engagement with the first ratchet gear when activated by electric power.

9. The method of claim 8, further comprising coupling a second end of the actuator to the second pawl, wherein the actuator is configured to rotate the second pawl out of engagement with the second ratchet gear when activated by electric power.

10. The method of claim 7, further comprising installing a first spring into the middle phalange that biases the first pawl into engagement with the first ratchet gear and installing a second spring into the middle phalange that biases the second pawl into engagement with the second ratchet gear.

11. The method of claim 7, further comprising coupling threading a line through the proximal phalange and through the middle phalange and coupling a first end of the line to the distal phalange.

12. The method of claim 11, further comprising coupling a second end of the line to a second actuator that is located off of the articulated finger, wherein when the second actuator is activated by electric power it contracts, pulls on the line, and causes the articulated finger to close.

13. The method of claim 12, coupling the second actuator to a gripper body and coupling the proximal phalange to the gripper body.

14. A portable multi-finger gripper, comprising:
an electric battery;
a gripper body retaining the electric battery;
a plurality of articulated fingers with self-locking joints each coupled to the gripper body, wherein at least one articulated finger of the plurality of articulated fingers is oriented to close in opposition to the closing direction of at least one other articulated finger of the plurality of articulated fingers, wherein each articulated finger comprises:
a distal phalange;
a middle phalange;
a first ratchet, wherein the first ratchet, a distal end of the middle phalange, and a proximal end of the distal phalange are coupled together to form a first self-locking joint;
a proximal phalange;
a second ratchet, wherein the second ratchet, a proximal end of the middle phalange, and a distal end of the proximal phalange are coupled together to form a second self-locking joint; and
a grip release actuator coupled to the middle phalange, electrically coupled to the electric battery, wherein the grip release actuator is operable to escape the first ratchet and the second ratchet; and a plurality of grip close actuators retained by the gripper body, electrically coupled to the electric battery, wherein each grip close actuator is mechanically coupled to one articulated finger and operable to drive the articulated finger to close.

15. The portable multi-finger gripper of claim 14, further comprising
a grip close control button retained by the gripper body, wherein the grip release actuator is controlled by the grip close control button; and
a grip release control button retained by the gripper body, wherein the grip release actuator is controlled by the grip release control button.

16. The portable multi-finger gripper of claim 14, wherein the distal phalange, the middle phalange, and the proximal phalange comprise photosensitive resin.

17. The portable multi-finger gripper of claim 14, wherein each articulated finger further comprises a first pawl, a first spring operable to bias the first pawl into engagement with a first ratchet gear of the first ratchet, a second pawl, and a second spring operable to bias the second pawl into engagement with a second ratchet gear of the second ratchet.

18. The portable multi-finger gripper of claim 17, wherein a stiffness of the first spring is different from the stiffness of the second spring.

19. The portable multi-finger gripper of claim 14, wherein each articulated finger further comprises a soft silicone skin over the proximal phalange, the middle phalange, and the distal phalange.

* * * * *